United States Patent [19] [11] 3,893,085
Hansen [45] July 1, 1975

[54] READ MOSTLY MEMORY CELL HAVING BIPOLAR AND FAMOS TRANSISTOR

[75] Inventor: Aage A. Hansen, Wappingers Falls, N.Y.

[73] Assignee: International Business Machines Corporation, Armonk, N.Y.

[22] Filed: Nov. 28, 1973

[21] Appl. No.: 419,587

[52] U.S. Cl. .......... 340/173 R; 317/235 R; 307/238
[51] Int. Cl. .......... G11c 11/40
[58] Field of Search .......... 317/235 R, 235 B; 340/173 R; 307/238, 279; 357/43

[56] References Cited

UNITED STATES PATENTS 3,660,819 5/1972 Bentchkowski .......... 340/173 R

*Primary Examiner*—Terrell W. Fears
*Attorney, Agent, or Firm*—Theodore E. Galanthay

[57] ABSTRACT

Disclosed is a memory cell incorporating the major advantages of a read only storage (ROS) and having the flexibility of on-chip personalization after processing. In a memory matrix having orthogonally arranged bit lines and word lines with memory cells located at the cross points, each of the disclosed memory cells constructed in accordance with BIFET technology includes a floating gate avalanche breakdown MOS transistor (FAMOS) coupled to a bipolar transistor. The residual charge on the floating gate FAMOS transistor determines the logical state of the read mostly memory cell.

19 Claims, 4 Drawing Figures

READ MOSTLY MEMORY CELL HAVING BIPOLAR AND FAMOS TRANSISTOR

CROSS REFERENCES TO RELATED PATENT APPLICATIONS AND/OR PATENTS

1. High Voltage Integrated Driver Circuit and Memory Embodying Same by Aage A. Hansen et al., application Ser. No. 319,966 filed on Dec. 29, 1972, now U.S. Pat. No. 3,843,954 and assigned to the assignee of the present application.

2. Electrically Erasable Floating Gate FET by Shakir A. Abbas et al., application Ser. No. 341,814 filed on Mar. 16, 1973, now U.S. Pat. No. 3,836,992 and assigned to the assignee of the present application.

BACKGROUND OF THE INVENTION

1. Field of the Invention

This invention relates to a read mostly memory array and more particularly to a memory cell useful in such an array. The memory cell of this invention incorporates the advantages of a read only storage ROS with the flexibility of personalization on-chip after processing.

2. Description of the Prior Art

In the prior art of digital computer memories, digital electronic memories having storage cells fabricated in accordance with monolithic integrated semiconductor circuit technology are notoriously well known. Known memory cells have been constructed in accordance with field effect transistor FET technology, bipolar transistor technology, as well as FAMOS technology. One such cell including an electrically erasable FAMOS device is disclosed in the cross-referenced patent by Abbas et al. These various prior art digital electronic storage cells include any number of devices to store digital information and are frequently characterized in accordance with the number of devices in the cell. Such memory cells are also characterized by whether they are DC stable or AC stable, in the latter case requiring periodic refreshing of the information. A further characterization by function relates to whether a memory is a read only memory (ROM) or a read write (R/W) memory in which information is readily altered. A more recent development is the read mostly digital memory.

Read mostly digital memories are most frequently utilized as control storage wherein the same information is required for an extended period of time. However, the information is alterable, as desired, by a write cycle that is usually longer than the write cycle for a read write memory. A relatively long write cycle, is significantly faster and more economical than replacement of the unit as is customary with read only memories. At the same time, in read mostly memories, an attempt is made to retain the various advantages of read only memories such as higher density of integration, speed, low power requirements, and DC stability.

SUMMARY OF THE INVENTION

It is a primary object of this invention to provide an improved memory cell for use in an improved read mostly digital memory.

It is another object of this invention to provide an improved read mostly memory cell incorporating the various advantages usually associated with ROS cells.

It is still another object of this invention to provide a read mostly memory array that can be reprogrammed in a machine environment with potential levels available for the normal operation of the machine.

It is a further object of this invention that the disclosed memory cell be readily fabricatable with known integrated semiconductor circuit technology.

The foregoing and other objects, features, and advantages are more particularly pointed out in the description of the preferred embodiment of the invention as illustrated in the accompanying drawings.

DESCRIPTION OF THE PREFERRED EMBODIMENT

Figure 1:
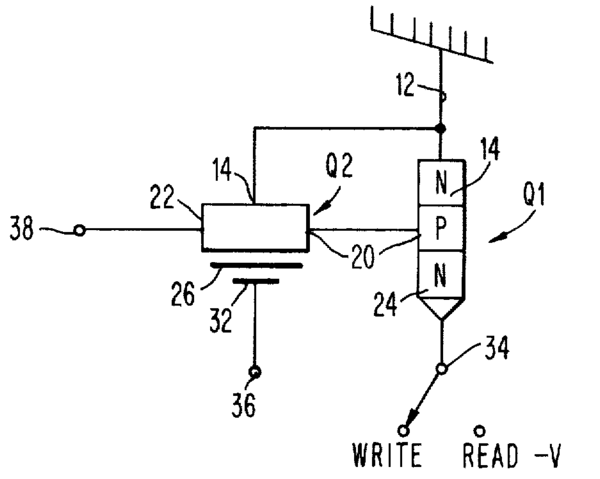
FIG. 1 is a schematic circuit diagram of the storage cell of the present invention.

In accordance with the present invention, a read mostly memory array or portion thereof is fabricated on a semiconductor wafer or chip. As illustrated in FIG. 1, each memory cell consists of a bipolar transistor Q1 and a FAMOS device Q2. Accessing lines commonly referred to as bit lines 12 and word lines 38 are orthogonally arranged with the memory cells located at the various crosspoints. The FAMOS device has a pair of gated electrodes 20 and 22, one of the gated electrodes 22, being connected to one of the accessing lines such as a word line 38, for example. The other gated electrode 20 of the FAMOS is connected to the base region 20 of the bipolar transistor. Note that in integrated circuit practice, a single semiconductor region can form base region 20 and gated electrode 20; this being the reason for designating the two circuit elements by the same reference numeral. The substrate 14 of the FAMOS device is connected to the collector 14 of the bipolar transistor which is also connected to the other one of the accessing lines such as a bit line 12, also referred to as a bit/sense line. In integrated circuit practice, substrate 14 and collector 14 are part of the same semiconductor region. It is important here to note that in integrated circuit practice, connecting line 12 formed by a subcollector region 12 (FIG. 2) is the actual collector region of transistor Q1. The FAMOS device Q2 has a pair of gating electrodes, a first gate 26 being a floating gate having no direct electrical connection elsewhere in the circuit. The second gate 32 also referred to as an erase gate, is connected to an erase line 36. The emitter region 24 of the bipolar transistor is connected to a terminal 34.

Figure 2:
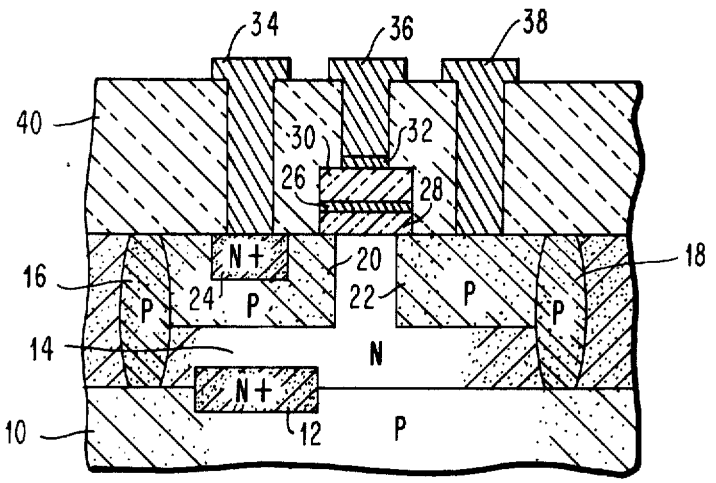
FIG. 2 is a cross sectional diagram of the integrated semiconductor structure of the cell of the present invention.

Referring now to FIG. 2, the device is shown in cross section as fabricated in accordance with bipolar-FET (BIFET) technology. Initially, a p type substrate 10 is provided and an n+ subcollector region 12 is formed therein. This subcollector region 12 acts as the collector for transistor Q1 and forms the bit line for the memory cell, contacting the substrate 14. Next, a layer of n type epitaxial material is grown as a layer 14 causing a portion of the subcollector 12 to outdiffuse as shown.

P doped isolation regions 16 and 18 together with p regions 20 and 22 are next formed into epitaxial layer 14. The formation of such isolation regions 16 and 18 and pockets 20 and 22 are well known in the art and can be accomplished by diffusion, ion implantation, or other related techniques. Next, an n+ region 24 is formed into pocket 20 by one of the aforementioned well known techniques such as diffusion, for example. It is noted at this point that pocket 20 forms the base of bipolar transistor Q1 and the pockets 20 and 22 collectively form the gated electrodes (drain and source) of transistor Q2. The n+ region 24 forms the emitter region of transistor Q1 while the epitaxial N region 14 within the isolation regions 16 and 18 forms the substrate region of Q2. A floating gate 26 is than formed over an isolation region 28 in the well known manner of FAMOS fabrication. A second isolation layer 30 separates the erase gate 32 from the floating gate 26. Conductive connections 34, 36, and 38 are then formed through the isolation material 40 also by well known process techniques. Note that the circuit equivalent of the structure in FIG. 2 has been correspondingly numbered in FIG. 1 insofar as possible. For example, the bit line 12 indicated as a conductor in FIG. 1 is actually a highly doped buried subcollector region 12 as noted in FIG. 2.

Figure 3:
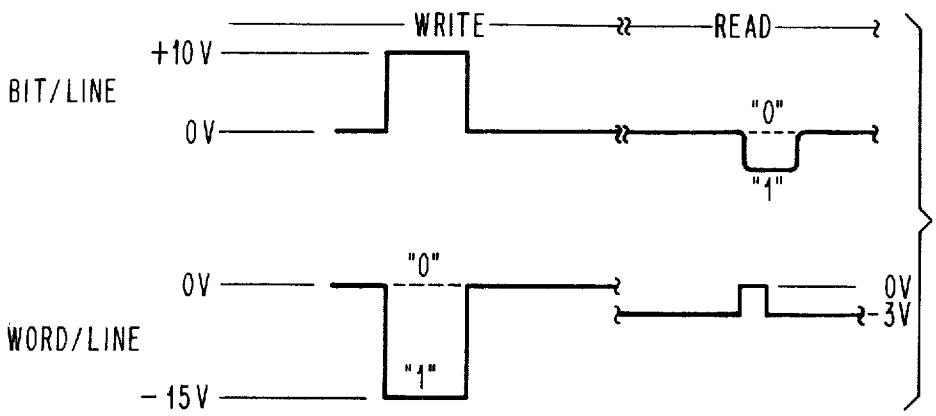
FIG. 3 is a wave form diagram illustrating the operation of the herein disclosed circuits.

In operation, personalization is performed by avalanche injection illustrated by the wave form of FIG. 3. In order to write into a particular cell, the bit line 12 is raised to approximately +10 volts raising the collector region of Q1 and the substrate of Q2 to this potential. If a logical 0 is to be written, the word line 38 is maintained at 0 potential providing no avalanche breakdown in transistor Q2. In the other alternative, however, if a logical 1 is to be written, the word line 38 is brought to a down level such as minus 15 volts. This creates a potential difference of 25 volts between Q2's substrate 14 and its gated electrode region 22. For the FAMOS devices under consideration, 25 volts is sufficient to exceed the avalanche potential causing injection of hot electrons into the floating gate 26. For write operations, the emitter electrode 34 is left floating. The hot electrons trapped at the floating gate cause FAMOS device Q2 to be conditioned into its low impedance state for an extended period of time, possibly years.

The foregoing writing phenomenon occasioned by electron injection in the disclosed P channel transistor occurs predominately because of accelerating the electric field across the gate oxide 28. The electrons captured at the floating gate 26 act to raise the breakdown voltage and hence, decrease the avalanche efficiency. The happens very rapidly as soon as the avalanching voltage is reached and the device turns on. However, it is both amplitude and time dependent. The time dependence is due to the fact that the electric field reduces as the charge on the gate increases and fewer electrons are accellerated to the gate.

With continued reference to FIG. 3, the read operation will now be described. Note at the outset that the bit line 12 in practice is a bit/sense line through which the state of the cell is sensed. When the cell is in a reading mode, the emitter terminal 34 of transistor Q1 is coupled to a negative potential such as minus 3 volts. The word line 38 is pulsed between this negative potential of minus 3 volts and a positive potential such as ground. The information stored in the floating gate is then sensed on the bit/sense line 12. A logical 1 is said to be stored, when the floating gate has been charged such that the transistor Q2 is conductive (in its low impedance state) and the signal is transferred from the word line to the bit/sense line. Specifically, if Q2 is conductive, an up level signal on word line 38 turns transistor Q1 on bringing bit/sense line 12 to a down level. If a logical 0 is stored the floating gate has not been charged, transistor Q2 does not conduct, and the signal from the word line 38 is not transferred to the base of Q1 keeping Q1 off permitting bit/sense line 12 to remain at an up level such as ground.

In order to erase the information stored in FAMOS transistor Q2, an erase gate 32 is provided. In the event a large potential in the order of 30 to 35 volts AC at a frequency such as 60 cycles is applied to the erase gate 32, the cell is erased in less than 10 cycles bringing the charge on the floating gate 26 back to 0 volts.

Figure 4:
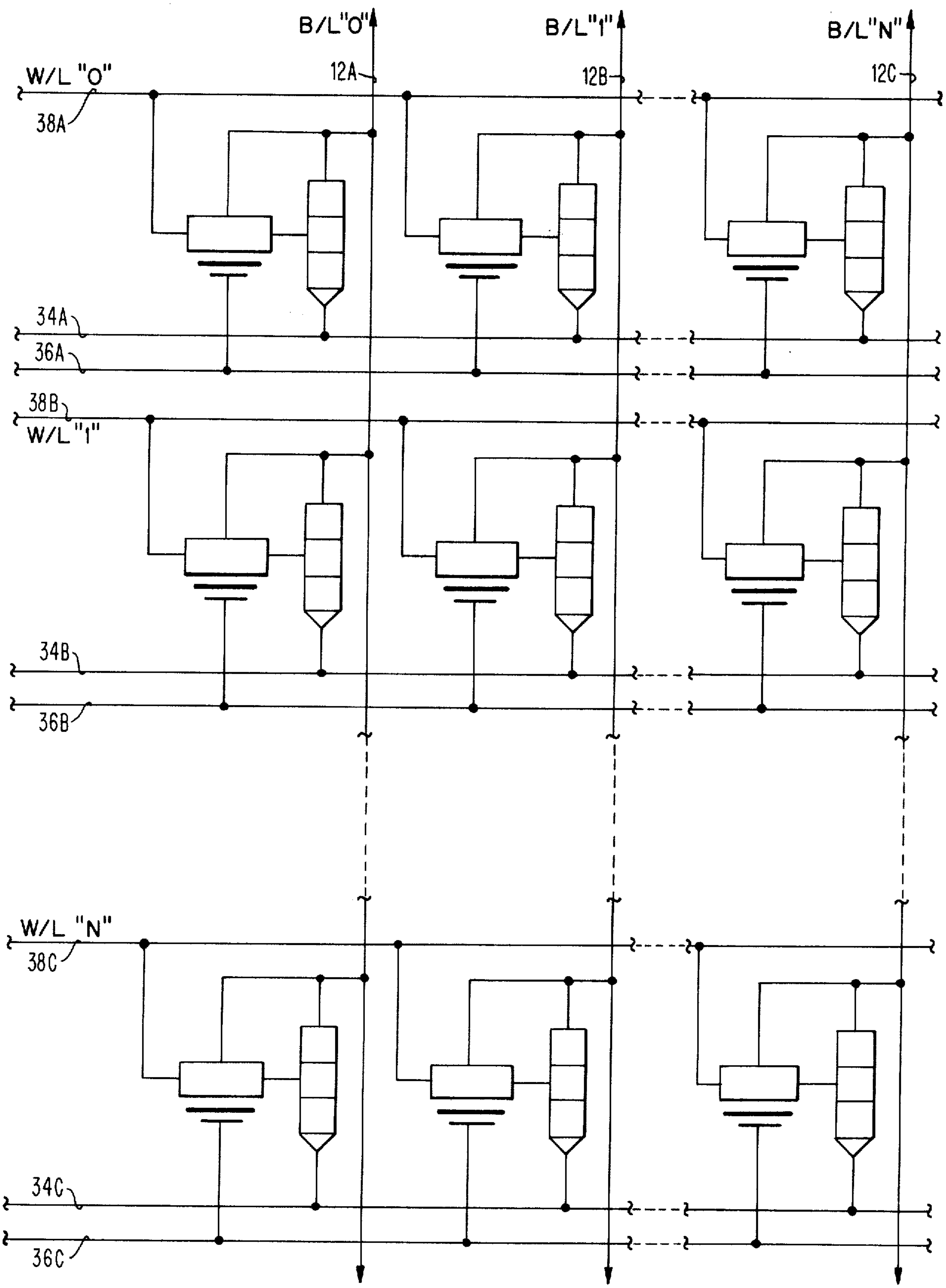
FIG. 4 is a schematic diagram of a memory array or portion thereof constructed in accordance with the memory cells of the present invention.

Refer now to FIG. 4 illustrating the arrangement of a plurality of cells in an array. Orthogonal accessing lines including the word lines W/L 0, 1, and N and bit lines BL 0, 1 and N are shown connected to each of the cells as in FIG. 1. It is again noted that the bit lines are formed by the subcollector. Accordingly, there are absolutely no intersecting lines since the common emitter coupling lines such as 34A, 34B, and 34C run parallel with (or at least in the same direction) as the erase lines 36A, 36B and 36C. Note that the various connecting lines have been labeled with alphabetical letters and numerals corresponding to the designation first provided in FIG. 1.

What has then been described is a read mostly memory incorporating the advantages of a ROS. Density, speed, nonvolatility and low power correspond to those normally available only with a read only storage. The disadvantages of a ROS are eliminated by the ability to personalize after fabrication. It is noted that reprogramming is possible by causing avalanche breakdown in device Q2 by combining a positive and negative potential collectively sufficient to cause injection of hot electrons into the floating gate. At the same time neither the positive or negative potential in and of itself is high enough to cause avalanche breakdown in any of the support circuits permitting writing to take place in a normal machine environment. The connection of the Q2 substrate 14, subcollector 12 regions permits this mode of operation. It is recognized that for purposes of reading, this connection is not required since information can be sensed by Q1 by noting the impedance state of gateable transistor Q2. The base of Q1 detects the stored information depending on the impedance stage of Q2.

While the invention has been particularly shown and described with reference to preferred embodiments, thereof, it will be understood by those skilled in the art that various changes in the form and detail may be made therein without departing from the spirit and scope of the invention.

What is claimed is:

1. A memory cell comprising:
an input node;
a transistor having collector, base, and emitter regions; and
a FAMOS device connected between the base region of said transistor and said input node.

2. A memory cell as in claim 1 wherein said FAMOS device connected between the base region of said transistor and said input node includes a substrate, a pair of gated electrodes, and a floating gate.

3. A memory cell as in claim 2 wherein said FAMOS device further comprises:

an erase gate.

4. A memory cell as in claim 2 wherein the substrate of said FAMOS device is connected to the collector region of said transistor, the base of said transistor being integral with one of the gated electrodes of said FAMOS device.

5. A memory cell as in claim 4 wherein the other gated electrode of said FAMOS device is connected to said input node, said input node being a word line, the substrate of said FAMOS device being connected to a bit line, the emitter region of said transistor being left floating during a write operation, said emitter region being connected to a steady state potential during a read operation.

6. A memory array comprising:

a plurality of bit lines arranged in a substantially parallel relationship with respect to each other;

a plurality of word lines arranged in a substantially parallel relationship with each other and forming a matrix in a substantially perpendicular relationship with said bit lines; and a plurality of memory cells as in claim 5, each of said cells having an electrical connection to one of said word lines and one of said bit lines.

7. A memory array comprising:

a plurality of bit lines arranged in a substantially parallel relationship with respect to each other;

a plurality of word lines arranged in a substantially parallel relationship with each other and forming a matrix in a substantially perpendicular relationship with said bit lines; and a plurality of memory cells as in claim 4, each of said cells having an electrical connection to one of said word lines and one of said bit lines.

8. A memory array comprising:

a plurality of bit lines arranged in a substantially parallel relationship with respect to each other;

a plurality of word lines arranged in a substantially parallel relationship with each other and forming a matrix in a substantially perpendicular relationship with said bit lines; and a plurality of memory cells as in claim 2, each of said cells having an electrical connection to one of said word lines and one of said bit lines.

9. A memory array comprising:

a plurality of bit lines arranged in a substantially parallel relationship with respect to each other;

a plurality of word lines arranged in a substantially parallel relationship with each other and forming a matrix in a substantially perpendicular relationship with said bit lines; and a plurality of memory cells as in claim 1, each of said cells having an electrical connection to one of said word lines and one of said bit lines.

10. A memory cell as in claim 1 having a monolithically integrated structure comprising:

a first common semiconductor region forming one of the gated regions of said FAMOS device and the base region of said transistor; and a second common region forming the substrate of said FAMOS device and a contact for the subcollector region of said transistor.

11. A monolithically integrated memory cell structure comprising:

a substrate being doped with an impurity of a first conductivity type;

a subcollector region formed in said substrate, said subcollector region being doped with an impurity of a second conductivity type;

an epitaxial layer formed over said substrate, said epitaxial layer being doped with an impurity of said second conductivity type;

at least two pockets of said first conductivity type formed in said epitaxial layer;

a region of said second conductivity type formed in one of said pockets; and a floating gate formed over a portion of said epitaxial layer between said pockets.

12. A memory cell structure as in claim 11 wherein said subcollector region forms a bit/sense line.

13. A monolithic memory cell structure as in claim 11 wherein said at least two pockets form the gated electrodes of a FAMOS device, one of said pockets also forming the base region of a transistor.

14. A monolithically integrated memory cell structure as in claim 11 wherein a portion of said epitaxial layer forms the substrate of a FAMOS device and a contact for the subcollector region of a transistor.

15. A monolithically integrated memory cell structure as in claim 11 wherein said region of second conductivity type formed in one of said pockets forms the emitter of a transistor.

16. A monolithically integrated memory structure as in claim 11 further comprising:

an erase gate formed over at least a portion of said floating gate.

17. A memory cell comprising:

an input node;

a transistor having collector, base, and emitter regions; and a field effect device having drain source and gate regions and adapted to receive trapped charge in the gate region, connected between the base region of said transistor and said input node.

18. A memory cell comprising:

an input node;

a transistor having collector, base, and emitter regions; and a field effect device having drain source and gate regions connected between the base region of said transistor and said input node, said field effect device having a substrate region electrically common with said collector region.

19. Monolithically integrated memory cell structure comprising:

a first region being doped with an impurity of a first conductivity type;

a second region formed in said first region, said second region being doped with an impurity of a second conductivity type;

a third region formed over said first region, said third region being doped with an impurity of said second conductivity type;

at least two pockets of said first conductivity type formed in said third region;

a fourth region of said second conductivity type formed in one of said pockets; and a gate formed over a portion of said third region between said pockets.

* * * * *